Figure 3:
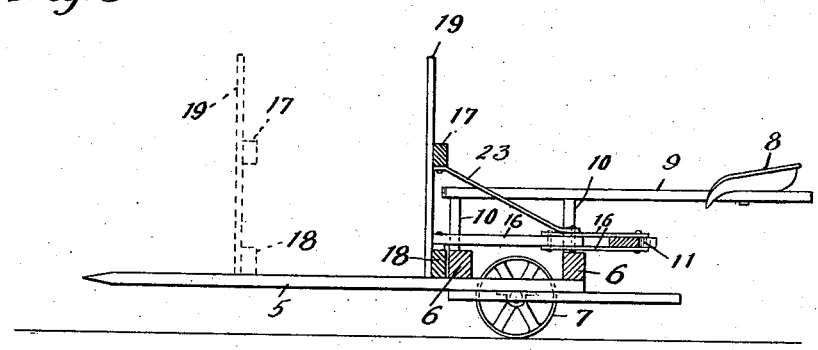

No. 857,374. PATENTED JUNE 18, 1907.
D. F. ANDERSON.
HAY RAKE.
APPLICATION FILED DEC. 1, 1905. RENEWED MAY 6, 1907.
2 SHEETS—SHEET 1.
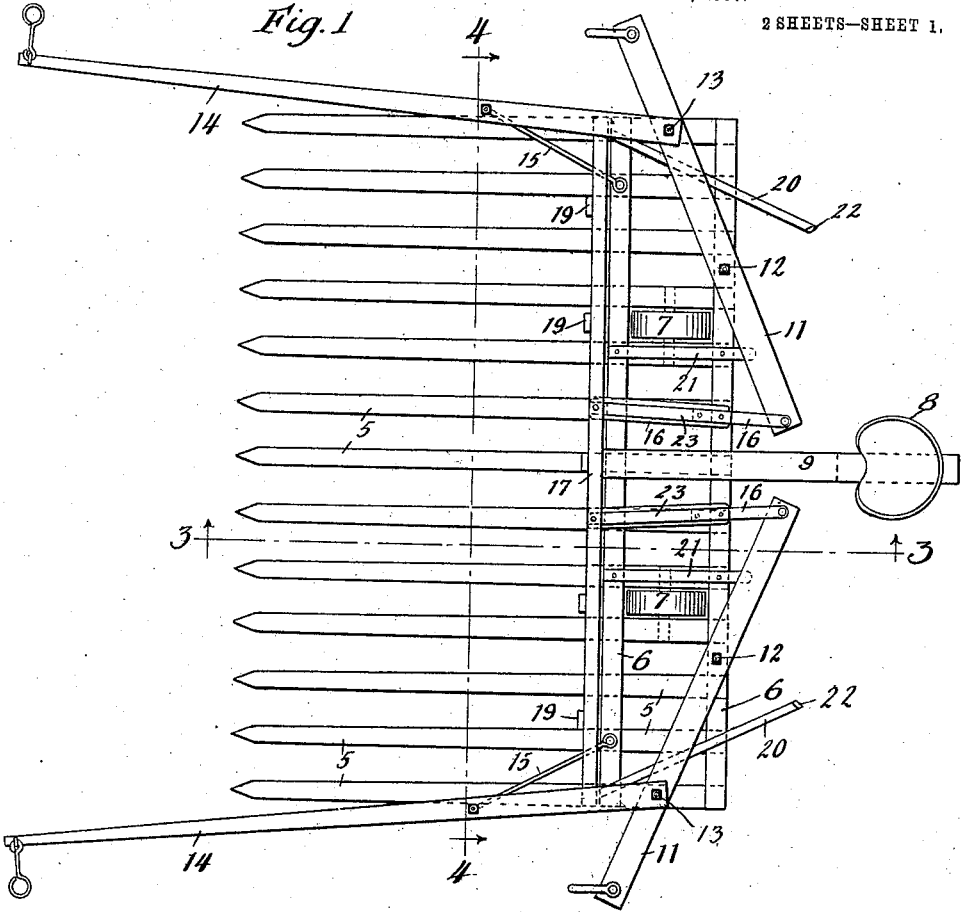
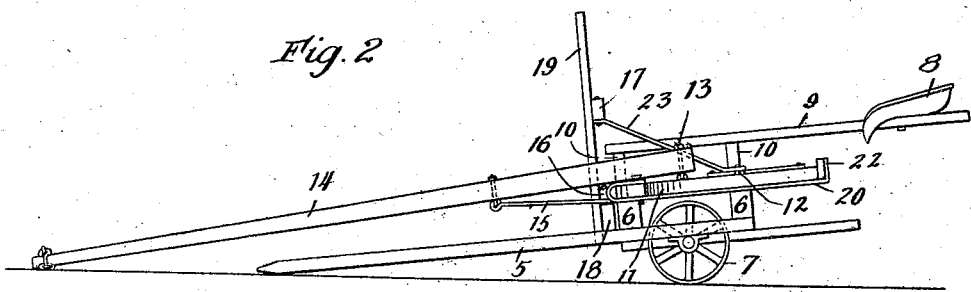
Witnesses:
Inventor:
David F. Anderson
By Munday, Evarts & Adcock
Attorneys No. 857,374. PATENTED JUNE 18, 1907.
D. F. ANDERSON.
HAY RAKE.
APPLICATION FILED DEC. 1, 1905. RENEWED MAY 6, 1907.

2 SHEETS—SHEET 2.

Witnesses:
Wm. Geiger

Inventor:
David F. Anderson
By Munday, Evarts & Adcock
Attorneys

UNITED STATES PATENT OFFICE.

DAVID F. ANDERSON, OF COUNCIL BLUFFS, IOWA, ASSIGNOR TO E. CHILDREN'S SONS MANUFACTURING CO., OF COUNCIL BLUFFS, IOWA, A CORPORATION OF IOWA.

HAY-RAKE.

No. 857,374. Specification of Letters Patent. Patented June 18, 1907.

Application filed December 1, 1905. Renewed May 6, 1907. Serial No. 372,029.

*To all whom it may concern:*

Be it known that I, DAVID F. ANDERSON, a citizen of the United States, residing in Council Bluffs, in the county of Pottawattamie and State of Iowa, have invented a new and useful Improvement in Hay-Rakes, of which the following is a specification.

This invention relates to the construction of hay rakes, or as they are sometimes termed sweep rakes, and especially to the method of operating the discharging devices used thereon.

My object in the invention has been to provide means for operating the discharging head or devices by power from the horses so that the driver is relieved of all exertion in the unloading operation, and to that end in the preferred construction, I connect the head to the draft devices in such manner that the horses, when they stop the forward or gathering movement, may by backing and turning outwardly or away in opposite directions from the line of motion of the machine, cause the operation of the head. This result will be fully understood from the drawing forming a part of this specification.

Figure 4:
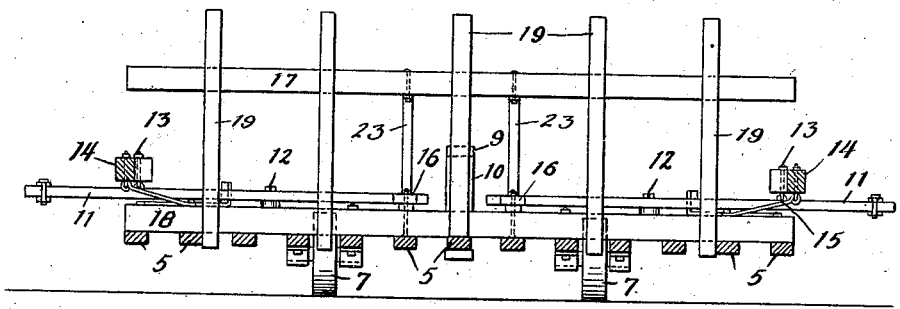

Figure 1 is a plan of a two wheel rake embodying the invention, and Fig. 2 is a side elevation of the same. Figs. 3 and 4 are sections on the lines 3—3 and 4—4 respectively of Fig. 1.

In said drawing, 5 5 represent the teeth of the rake, connected to beams 6 6 of the main frame, at their rear ends. The supporting wheels are shown at 7 7, and 8 is the driver's seat supported by the rearwardly extended bar 9 mounted upon risers 10 10. The draft bars one at each side, are shown at 11, 11, and they are each pivoted between their ends to the main frame as illustrated at 12, the outer ends being adapted for the attachment of the horses, and the inner ends being connected to the push off or discharging head as explained later on. The positions of the draw-bars while gathering a load are those shown at Fig. 1. Attached to each draw-bar by a pivot 13 is a tongue or pole 14, having means at its forward end for the hitching of the horse's collar. Each pole is controlled to some extent by a rod or connection 15 pivotally joined both to the pole and to the main frame, the main purpose of the rod being to enable the pole, in the discharging operation, to swing the draw-bar on its pivot 12. It will be seen from Fig. 1 that if the forward movement of the rake is stopped and the horses are backed and turned outward from the line of movement that the poles will swing and push back the outer end of the draw-bars, being enabled to do so by the resistance of the rods 15, through the fixed pivots in the main frame. The movement thus given the two draw-bars, is carried by links 16 to the discharging head which desirably consists of cross bars 17 and 18, the latter riding on the teeth and the series of uprights 19 attached to said bars. The links are pivoted to the inner ends of the draw-bars, and to the bar 18, and the latter is preferably located as shown so that the pushing power from the draw-bars may be imparted to the load near the horizontal center of the latter. The head will be carried from its normal position shown at Fig. 1 to the position indicated in dotted lines at Fig. 3, and in so doing effects the unloading. When the horses resume their forward movement, the head will automatically return to the position of Fig. 1.

Rods 20 are desirably provided on the main frame and arranged diagonally so they may support the outer ends of the draw-bars and maintain them in their proper horizontal plane, and flat bars 21 are also preferably provided on the main frame to support the inner ends of the bars. The rods 20 are turned up at their rear ends, as seen at 22, so they may limit the swinging movements of the bars. The poles or tongues may be attached at their forward ends to the pole straps instead of the horse collars, and in the discharging operation, the backing movement is mainly relied on.

I claim:—

1. The combination in a hay rake, of a discharging head, pivoted draw-bars, connections from the inner ends of said draw-bars to the discharging head, and poles for the attachment of the horses pivoted to the outer ends of the draw-bars.

2. The combination in a hay rake, of draft bars pivotally mounted on the main frame, poles or tongues joined to the outer ends of the bars, and a discharging head connected to the inner ends of the bars.

3. The combination with the discharging head of a hay rake, of pivoted draft bars, the inner ends of which are mechanically connected to the discharging head, and the outer ends are provided with means for the attachment of the horses.

4. The combination with the discharging head of a hay rake, of pivoted draft bars, tongues connected to the outer ends of the bars and also connected to the frame of the rake by the rods 15, and connections from the inner ends of the bars to the discharging head.

5. The combination in a hay rake, of a discharging head, pivoted draw-bars, connections from said head to the draw-bars, and tongues attached to the draw-bars and also connected to the main frame by stays.

6. The combination in a hay rake, of a discharging head, pivoted draw-bars connected to and operating said head, and poles or tongues pivotally joined to the draw-bars and braced from the stationary part of the frame essentially as described, whereby the backing or turning of the horses operates the discharging head.

7. The combination in a hay rake, of a discharging head, a draw-bar at each side of the center of the machine having its inner end joined to the head, a tongue or pole at each side of the machine pivotally joined to the draw-bar upon the same side of the machine with it, and stays or braces connecting said poles near their junction with the draw-bars to the main frame.

8. The hay rake having a discharging head in combination with pivoted draw-bars, one at each side of the machine, pushing connections between said draw-bars and the head, and tongues, one at each side, pivoted to the draw-bars and having means for attachment to the horses' collars or pole strips.

9. The hay rake wherein are combined a discharging head, pivoted draw-bars connecting to and operating said head, and poles or tongues 14 pivoted to the draw-bars and provided with means for their attachment to the horses' collars or pole strips.

10. In a hay rake, the combination of a discharge head, draw-bars operating said head, and tongues or poles, one at each side of the machine and flexibly united to the bars, and also connected to the main frame, and having means at their forward ends for attachment to the horses' collars or pole straps, whereby the horses are enabled to swing said poles backward or outward in the discharging movement.

DAVID F. ANDERSON.

Witnesses:
 H. S. BLINN.
 THOS. THOMPSON.